United States Patent [19]

Kuroda et al.

[11] Patent Number: 4,738,855

[45] Date of Patent: Apr. 19, 1988

[54] STRENGTHENED GELLING MATERIAL AND MANUFACTURING METHODS THEREOF

[75] Inventors: Namio Kuroda, Kawasaki; Morio Nagai, Huchu, both of Japan

[73] Assignee: Q.P. Corporation, Japan

[21] Appl. No.: 883,575

[22] Filed: Jul. 9, 1986

[51] Int. Cl.$^4$ .............................................. A23L 1/302
[52] U.S. Cl. ...................... 426/72; 426/311; 426/614; 426/573
[58] Field of Search ................. 426/72, 573, 614, 271, 426/311

[56] References Cited

U.S. PATENT DOCUMENTS

| | | | |
|---|---|---|---|
| 2,881,077 | 4/1959 | Kline et al. | 426/614 X |
| 2,919,992 | 1/1960 | Gorman et al. | 426/614 X |
| 3,800,047 | 3/1974 | Pulley | 426/311 X |
| 3,958,017 | 5/1976 | Morse et al. | 426/72 |
| 4,187,322 | 2/1980 | Josse et al. | 426/311 X |

FOREIGN PATENT DOCUMENTS

| | | | |
|---|---|---|---|
| 45-13425 | 5/1970 | Japan | 426/614 |
| 0136563 | 11/1978 | Japan | 426/573 |
| 0029979 | 3/1981 | Japan | 426/72 |

*Primary Examiner*—Raymond N. Jones
*Assistant Examiner*—C. Callahan
*Attorney, Agent, or Firm*—Jordan B. Bierman

[57] ABSTRACT

A strengthened gelling material containing dried egg albumen and one or more vitamin C compounds selected from the group consisting of vitamin C and vitamin C salts, and methods for manufacturing the strengthened gelling material including addition of vitamin C compounds to dry egg albumen, additional heat treatment of the above mixture, addition of vitamin C compounds to liquid egg white followed by drying, and additional heat treatment of the above dry mixture.

28 Claims, No Drawings

STRENGTHENED GELLING MATERIAL AND MANUFACTURING METHODS THEREOF

BACKGROUND OF THE INVENTION

This invention relates to a strengthened gelling material based on dry egg albumen that provides coagulation having enhanced gel strength.

Heretofore, dry egg albumen has been prepared by drying liquid egg white using various drying methods such as spray-drying, air-drying, freeze-drying or vacuum-drying to obtain egg albumen powder which normally contains 5 to 7 weight % of water. To obtain egg albumen powder containing a reduced number of living bacteria, the egg albumen powder has been kept at an elevated temperature of 55 to 65 degrees C. for several days and then allowed to cool. The dry egg albumen thus prepared has been widely used as a material in a variety of food applications. However, the above dry egg albumen is defective in that it does not have sufficient capability to coagulate when its aqueous solution is heated (hereinafter referred to as "gelation capability").

Japanese Patent Publication No. 16863/1975 discloses a method for manufacturing dry egg albumen in which liquid egg white is dried after adjusting its pH by adding a citric acid solution. The dry egg albumen obtained by the above method has a somewhat improved gelation capability, however, it does not provide the gel strength desired for use in paste products such as sausages.

On the other hand, a method for manufacturing dry egg albumen having an improved gelation capability is disclosed in Japanese Patent Application Laying-open No.149637/1983, in which liquid egg white is dried to obtain egg albumen powder containing 8 to 12 weight % water, and the egg albumen powder is kept at a temperature of 70 to 100 degrees C. for a specified period of time.

The above described dry egg albumen having improved gelation capabilities requires a longer time to control the water content more than usual and has an insufficient gelation capability which does not provide coagulation with high gel strength.

SUMMARY OF THE INVENTION

With a view to obviate all of the conventional art defects of dry egg albumen, it is a primary object of the present invention to provide a gelling material having enhanced gelation capability based on dry egg albumen, which provides coagulation with sufficient gel strength, and a manufacturing method thereof.

In accordance with the present invention which attains the above object, there is provided a strengthened gelling material comprising dry egg albumen and one or more compounds selected from the group consisting of vitamin C and vitamin C salts.

To obtain the strengthened gelling material which provides coagulation with sufficient gel strength, there are provided a first method for manufacturing the strengthened gelling material, in which one or more compounds selected from the group consisting of vitamin C and vitamin C salts are added to dry egg albumen in the form of powder or granules; a second method for manufacturing the strengthened gelling material, in which one or more compounds selected from the group consisting of vitamin C and vitamin C salts are added to dry egg albumen in the form of powder or granules to obtain a dry egg albumen mixture which is then stored at an elevated temperature; a third method for manufacturing the strengthened gelling material, in which one or more compounds selected from the group consisting of vitamin C and vitamin C salts are added to liquid egg white to obtain a liquid egg white mixture which is then dried; and a fourth method for manufacturing the strengthened gelling material, in which one or more compounds selected from the group consisting of vitamin C and vitamin C salts are added to liquid egg white to obtain a liquid egg white mixture, the liquid egg white mixture is dried and then stored at an elevated temperature.

The strengthened gelling material according to the present invention can be prepared by simply incorporating vitamin C and/or its salts in conventional egg albumen powder, which provides coagulation with sufficiently enhanced gel strength. Further, the strengthened gelling material provides coagulation with improved water-holding.

DETAILED DESCRIPTION OF THE INVENTION

The gelling material with enhanced gelation capability according to the present invention will now be described in detail.

The strengthened gelling material according to the present invention comprises dry egg albumen and vitamin C and/or its salts. A number of methods can be considered for the manufacture of the strengthened gelling material according to the present invention, and any method that provides a mixture of dry egg albumen and vitamin C and/or its salts, containing water in an amount of 5 to 11 weight %, preferably 6 to 9 weight %, may be used for the purpose. The strengthened gelling material according to the present invention can have a variety of forms depending on the manufacturing process, and is not specifically limited to but is preferably in the form of powder or granules for use in the applications of the material. It is preferable to contain the vitamin C and/or its salts in amounts of 0.1 weight % or more based on the dry egg albumen. If the content of the vitamin C and/or its salts is less than 0.1 weight %, the resulting gelling material will not have a sufficient gelation capability. The more the vitamin C compounds are contained, the more the gelation capability is enhanced. However, if the content reaches about 1 weight %, the coagulation prepared using the gelling material will become pinkish in color. Thus, in order to obtain the strengthened gelling material according to the present invention that has a sufficient gelation capability without coloring the resulting coagulation, the content of the vitamin C and/or its salts is preferably 0.1 to 1 weight % based on the dry egg albumen. Nonetheless, when the strengthened gelling material according to the present invention is used in sausage, it is not necessary to avoid coloring because sausage is normally pinkish in color; in such a case the content of the vitamin C and/or its salts can be more than 1 weight %. However, from the economical point of view, the content of the vitamin C and/or its salts should be at a maximum of 3 weight % based on the dry egg albumen.

The strengthened gelling material according to the present invention uses at least one substance selected from the group consisting of vitamin C and its salts. The vitamin C and its salts (hereinafter referred to as "vitamin C compounds") used in the present invention can be commercial products produced by normal processes. For example, the vitamin C is extracted from natural materials such as green tea, or synthesized by a chemical process. The vitamin C salts include sodium, potassium and calcium salts of vitamin C.

When the strengthened gelling material according to the present invention is dissolved in water and heated, it coagulates to produce coagulation with high gel strength. This is believed to be due to the fact that SH groups of the heat coagulating protein in the egg albumen are converted to SS groups by the action of the vitamin C compounds, thereby providing increased bonding strength between the protein molecules.

The methods for manufacturing the strengthened gelling material according to the present invention will now be described.

A first method for manufacturing the strengthened gelling material uses dry egg albumen as a raw material which is simply mixed with the above vitamin C compounds.

The dry egg albumen used in the present invention is prepared from liquid egg white by a drying process or by drying and heat-treatment. It can have a variety of forms depending on the drying process used, and is not specifically limited to but preferably in the form of powder or granules for use in the present invention. The liquid egg white is similar to that used in the conventional art, and can be, for example, that obtained by separating from shelled eggs or thawing frozen egg white, concentrated by a usual method, sterilized by heating at a temperature at which egg white is not denatured, or pretreated to decompose sugars, or desugaring, by a normal method using enzyme, yeast or bacteria as needed to present Maillard reaction (aminocarbonyl reaction) and drying smell generation that may occur during the heat-treatment.

The drying process can be that used for preparing normal dry egg albumen such as freeze-drying, pan-drying or spray-drying. The dry egg albumen can be heat-treated, for example, in a polyethylene container which is closed as needed, at a temperature of 55 to 75 degrees C. for a period of 3 to 8 days, preferably at 60 to 75 degrees C. for 5 to 8 days. The water content of the dry egg albumen obtained after drying, or after drying and heat-treatment, is to be 5 to 11 weight %, preferably 6 to 11 weight %. It is difficult to reduce the water content of the dry egg albumen below 5 weight %. If the water content exceeds 11 weight %, the dry egg albumen is liable to agglomerate into blocks during storage prior to the heat-treatment. As described above, the vitamin C. compounds are added in amounts of 0.1 weight % or more, preferably 0.3 to 1.0 weight %, based on the dry egg albumen. However, from the economical point of view, the content of the vitamin C and/or its salts should be at a maximum of 3 weight % based on the dry egg albumen.

The strengthened gelling material manufactured by the first method coagulates, when it is dissolved in water and heated, to produce coagulation with high gel strength due to the presence of the vitamin C compounds. The strengthened gelling material prepared from the heat-treated dry egg albumen coagulates with further enhanced gel strength as compared with that based on the untreated dry egg albumen.

A second method for manufacturing the strengthened gelling material according to the present invention uses dry egg albumen, which is mixed with vitamin C compounds, and then stored an an elevated temperature.

The second method uses a dry egg albumen which is not heat-treated. The water content of the dry egg albumen is to be 5 to 12 weight %, preferably 7 to 9 weight %. The content of the vitamin C compounds can be the same as for the first method.

The conditions of the heat treatment in the second method can be the same as for the dry egg albumen described above, at a temperature of 55 to 75 degrees C. for a period of 3 to 8 days, preferably at 60 to 75 degrees C. for 5 to 8 days, so that the resulting strengthened gelling material contains 5 to 11 weight %, preferably 6 to 9 weight % water. The heat-treatment specifically enhances the gelation capability of the gelling material, which could be considered as due to the fact that the vitamin C compounds are converted by heating to a substance that promotes the cross-linking reaction of egg proteins. Further, the heat-treatment sensitizes the inherent heat-coagulation property of the egg albumen. If the temperature of the heat-treatment is lower than 55 degrees C. or if the storage period is shorter than 3 days, it is difficult to obtain the effect of the present invention, and incomplete sterilization will result. If the temperature exceeds 75 degrees C., the egg albumen powder is liable to agglomerate into small lumps.

A third method for manufacturing the strengthened gelling material according to the present invention is to add the vitamin C compounds to the above liquid egg white and then to dry the mixture.

The addition of the vitamin C compounds to the liquid egg white prior to drying assures uniform contact of the egg albumen with the vitamin C compounds, thereby facilitating positive development of the effect of the present invention (enhanced gelation capability). Thus the vitamin C compounds are added in amounts of 0.01 weight % or more, preferably 0.03 to 0.1 weight %, to the liquid egg white. This content of the vitamin C compounds, after drying the mixture, will result in the strengthened gelling material containing 0.1 weight % or more of the vitamin C compounds to the dry egg albumen. However, from the economical point of view, the addition of the vitamin C compounds should be at the maximum of 0.3 weight % based on the liquid egg white.

The liquid egg white added with the vitamin C compounds can be freeze-dried, pan-dried, or spray-dried by the same method as for obtaining the dry egg albumen. For example, the mixture is spray-dried at an intake air temperature of 160 degrees C. and an exhaust air temperature of 70 degrees C. As described above, the water content of the resulting strengthened gelling material should be 5 to 11 weight %, preferably 6 to 9 weight %.

A fourth method for manufacturing the strengthened gelling material according to the present invention is the same as the third method with a heat-treatment process added. As described above, when a mixture of the liquid egg white and the vitamin C compounds is dried and then heat-treated, the vitamin C compounds would possibly be converted to a substance that promotes the cross-linking reaction of egg proteins, thereby specifically enhancing the gelation capability of the gelling material. Of course, the heat-treatment sensitizes the inherent heat-coagulation property of the egg albumen.

In the fourth method, the procedure up to the drying process can be the same as in the third method, and the water content of the dried mixture should be 5 to 12 weight %, preferably 7 to 9 weight %. The conditions of the heat treatment can also be the same as those for the second method above. The water content of the resulting strengthened gelling material should be 5 to 11 weight %, preferably 6 to 9 weight %, after the heat treatment.

As described in the foregoing pages, the strengthened gelling material according to the present invention can be manufactured by a number of methods, and provides a remarkably enhanced gelation capability by the function of the vitamin C compounds when it is dissolved in water and heated. The strengthened gelling material according to the present invention can be added to paste products, for example, to remarkably increase their gel strength. As shown in the test results, the coagulation of the strengthened gelling material has an improved water-holding property and, in turn, a reduced water-separation property.

The strengthened gelling material according to the present invention can be used as a material in various food applications, and when used in paste products, for example, it is added in amounts of 0.5 to 5 weight %.

Preferred embodiments of the strengthened gelling material according to the present invention and test results thereof will now be described.

EXAMPLE 1

10 kg of a dry egg albumen powder containing 6 weight % water, obtained by spray-drying liquid egg white which is desugared using yeast by a conventional method, is mixed with 30 g of vitamin C powder to obtain a strengthened gelling material according to the present invention.

EXAMPLE 2

Liquid egg albumen is desugared by a normal method with yeast, pan-dried at a temperature of 55 degrees C. for 25 hours, crushed by a hammer mill, and passed through a 5-10 mesh screen to obtain a granular dry egg albumen containing 10 weight % water. 10 kg of the granular dry egg albumen is mixed with 50 g of sodium ascorbate as a vitamin C compound to obtain a strengthened gelling material according to the present invention.

EXAMPLE 3

The same dry egg albumen as used in Example 1 is enclosed in a sealed polyethylene bug and kept at 65 degrees C. for 5 hours. 10 kg of the heat-treated dry egg albumen and 30 g of commercial vitamin C powder are mixed to obtain a strengthened gelling material according to the present invention.

EXAMPLE 4

The strengthened gelling material produced in Example 1 is enclosed in a sealed polyethylene bag and kept at 65 degrees C. for 5 hours to obtain a strengthened gelling material according to the present invention.

EXAMPLE 5

8.1 liters of a 10 weight % aqueous solution of commercial vitamin C is added to 100 kg of raw liquid egg white to obtain a mixture. The mixture is spray-dried by a conventional method at an intake air temperature of 160 degrees C. and an exhaust air temperature of 70 degrees C. to obtain a strengthened gelling material according to the present invention containing 6 weight % water.

EXAMPLE 6

The strengthened gelling material according to the present invention obtained in Example 5 is enclosed in a sealed polyethylene bag and kept at 75 degrees C. for 8 days to obtain a strengthened gelling material according to the present invention.

EXAMPLE 7

600 g of yeast is added to 300 kg of raw liquid egg white, and the mixture is kept at 30 degrees C. for 8 hours to complete desugaring treatment. 150 g of vitamin C powder is added to the desugared liquid egg white and uniformly mixed. The mixture is spray-dried at an intake air temperature of 150 degrees C. and an exhaust air temperature of 60 degrees C. to obtain 37 kg of dry egg albumen, which contains 6% water. The dry egg albumen is then enclosed in a sealed polyethylene bag and heated in a heating cabinet at 70 degrees C. for 4 days to obtain 37 kg of the strengthened gelling material according to the present invention.

Sausages, coagulated egg albumen, and pot-steamed hotchpotches using the strengthened gelling material according to the present invention will now be described.

(1) The following materials are cut by a speed-cutter for 5 minutes to obtain a paste.

| | |
|---|---|
| Pork | 80 kg |
| Starch | 5 kg |
| Salt | 1.5 kg |
| Sugar | 0.8 kg |
| Water | 12.7 kg |
| Total | 100 kg |

3 kg of the strengthened gelling material according to the present invention is added to the above paste and uniformly mixed to obtain a sausage base. The sausage base is enclosed in length of 15 cm in polyethylene casings of 3 cm in diameter, the bags are knotted, and heated in hot water at 72 degrees C. for 50 minutes to obtain 970 pieces of animal meat sausage.

(2) 1 kg of the strengthened gelling material according to the present invention is dissolved in 7 kg of water to obtain 8 kg of reconstituted liquid egg white. The reconstituted liquid egg white is enclosed in length of 30 cm in polyethylene casings of 5 cm in diameter, the bags are knotted, and heated in hot water at 80 degrees C. for 40 minutes to obtain 13 pieces of coagulated egg albumen.

(3) 1 kg of dry whole egg powder containing 4% water prepared by the normal method and 50 g of the above strengthened gelling material are dissolved in 8 kg of water to obtain egg solution for hotchpotch. The egg solution is mixed with 40 kg of a previously prepared soup stock to obtain a hotchpotch base solution. 200 cc of the hotchpotch base solution is placed in a 250 cc plastic vessel, with suitable amounts of egg, shrimps, white fish meat, boiled fish paste, and shiitake added, and steamed for 20 minutes to obtain 240 pot-steamed hotchpotches. These sausages, coagulated egg albumen and pot-steamed hotchpotches have sufficient gel strength.

TEST PROCEDURES AND RESULTS

Test 1

Test samples

Samples A, B, C and D of the strengthened gelling material according to the present invention are prepared as follows.

Sample A: Strengthened gelling material obtained in Example 1.
Sample B: Strengthened gelling material obtained in Example 4.
Sample C: Strengthened gelling material obtained in Example 5.
Sample D: Strengthened gelling material obtained in Example 6.

Comparison samples

Comparison samples 1 and 2 are prepared as follows.

Comparison sample 1:
Dry egg albumen used in Example 1.

Comparison sample 2: (Corresponding to Japanese Patent Publication No.16863/1975)
30 cc of a 10 weight % citric acid aqueous solution is added to 1 kg of raw liquid egg white to adjust the pH to 6.23. The mixture is spray-dried by a conventional method at an intake air temperature of 160 degrees C. and an exhaust air temperature of 70 degrees C. to obtain a dry egg albumen containing 6% water. The resulting dry egg albumen contains 120 g of albumen powder and 3 g of citric acid.

Test method 1 part by weight of each sample is dissolved in 7 parts by weight of water. The sample solution is enclosed in two polyethylene casings with a folded width of 57 mm. The sample casings are heated at 80 degrees C. and 90 degrees C., respectively, for one hour to coagulate the samples. The coagulated samples are cut to a thickness of 3 cm and the gel strength of the samples is measured by a rheometer with a plunger diameter of 8 mm at an ascending speed of 6 cm/minute. The test results are shown in Table 1.

TABLE 1

| Temp. | Sample A | B | C | D | Comparison 1 | Comparison 2 |
|---|---|---|---|---|---|---|
| 80° C. | 120 | 150 | 160 | 410 | 100 | 110 |
| 90° C. | 140 | 160 | 180 | 420 | 110 | 120 |

(Gel strength in gram)

As shown in Table 1, Samples A through D of the strengthened gelling material according to the present invention have increased gel strengths over the Comparison samples 1 and 2 of the conventional art products.

Test 2

Comparison samples 1 and 2 (dry egg albumen) and Sample C (strengthened gelling material) as used in Test 1 above are separately enclosed in polyethylene bags, and heated in a heating cabinet under the conditions as shown in Table 2. Sample solutions are prepared and treated using the same procedure as in Test 1, and the gel strength is measured. The results are shown in Table 2.

TABLE 2

| Heating condition | Coagulating condition | Comparison sample 1 6% water | Comparison sample 2 6% water | Sample C 6% water |
|---|---|---|---|---|
| 55° C., 7 days | 70° C., 1 hour | 5 | 5 | 220 |
|  | 80° C., 1 hour | 115 | 115 | 310 |
|  | 90° C., 1 hour | 150 | 155 | 520 |
| 65° C., 5 days | 70° C., 1 hour | 5 | 5 | 380 |
|  | 80° C., 1 hour | 120 | 120 | 490 |
|  | 90° C., 1 hour | 160 | 160 | 580 |
| 75° C., 3 days | 70° C., 1 hour | 7 | 7 | 410 |
|  | 80° C., 1 hour | 130 | 135 | 590 |
|  | 90° C., 1 hour | 170 | 170 | 620 |

(Gel strength in gram)

Test 3

Comparison in water separation with heat-treated conventional art products

Coagulated Comparison samples 1 and 2 and Sample C obtained in Test 2 are 3 cm in width and cylindrical in form. Filter paper is attached to the both end faces of the cylindrical samples to remove separating water. The amount of separated water is measured after 1 hour and 2 hours, respectively, to determine the water separation rate. The results are shown in Table 3.

TABLE 3

| Heating condition | Coagulating condition | Comparison sample 1 6% water | | Comparison sample 2 6% water | | Sample C 6% water | |
|---|---|---|---|---|---|---|---|
|  |  | After 1 hour | After 2 hours | After 1 hour | After 2 hours | After 1 hour | After 2 hours |
| 55° C., 7 days | 70° C., 1 hour | 10.2 | 11.2 | 12.1 | 12.9 | 3.5 | 4.7 |
|  | 80° C., 1 hour | 9.5 | 10.5 | 11.7 | 12.7 | 3.5 | 4.7 |
|  | 90° C., 1 hour | 9.1 | 10.1 | 9.5 | 10.5 | 3.2 | 4.5 |
| 65° C., 5 days | 70° C., 1 hour | 11.1 | 12.0 | 12.0 | 12.8 | 3.1 | 4.2 |
|  | 80° C., 1 hour | 10.3 | 11.5 | 11.2 | 12.5 | 3.1 | 4.2 |
|  | 90° C., 1 hour | 9.7 | 11.0 | 10.0 | 11.0 | 2.9 | 4.1 |
| 75° C., 3 days | 70° C., 1 hour | 8.8 | 10.2 | 9.9 | 10.2 | 3.0 | 3.8 |
|  | 80° C., 1 hour | 8.4 | 9.5 | 8.5 | 9.5 | 3.0 | 3.8 |
|  | 90° C., 1 hour | 8.0 | 9.0 | 8.5 | 9.5 | 2.7 | 3.1 |

(Water separation rate in percent to coagulated egg albumen immediately after coagulation)

As shown in Table 3, Sample C according to the present invention has a particularly low water separation rate.

The water separation rate is calculated by the following equation.

$$\text{Water separation rate (\%)} = \frac{\text{Initial weight of coagulation} - \text{Weight after water separation}}{\text{Initial weight of coagulation}} \times 100$$

Test 4

Comparison with heat-treated conventional art product

Comparison sample 3 is prepared as follows.

Comparison sample 3: (Corresponding to Japanese Patent Application Laying-Open No.149637/1983)

A 10 weight % citric acid aqueous solution is added to 1 kg of raw liquid egg white to adjust its pH to 7.0. 2 g of bread yeast is added and the mixture is kept at 35 degrees C. for 4 hours for desugaring according to the conventional method. The pretreated liquid egg white is spray-dried at an intake air temperature of 160 degrees C. and an exhaust air temperature of 75 degrees C. to obtain 127 g of a dry egg albumen powder containing 9.5% water. The dry egg albumen powder is divided into portions of 10 g each, and each portion is enclosed in a sealed polyethylene bag. The polyethylene bags containing the dry egg albumen are stored at 75 degrees C. for 8 days, and then cooled to room temperature.

Comparison sample 3 and the Sample D used in Test 1 are tested using the same procedure as for Test 1. The test results are shown in Table 4.

TABLE 4

| Temp. | Sample D | Comparison sample 3 |
|---|---|---|
| 80° C. | 410 | 350 |
| 90° C. | 420 | 380 |

As shown in Table 4, the Sample D of the strengthened gelling material according to the present invention exhibits an enhanced gelation capability over the heat-treated conventional art dry egg albumen by virtue of the action of vitamin C. To obtain the Comparison Sample 3, it is necessary to adjust the water content of dry egg albumen before heat treatment to 8 to 12 weight %, which is greater than that of normal dry egg albumen. On the other hand, Sample D of the strengthened gelling material according to the present invention does not require any special adjustment of water content, and dry egg albumen containing 6 to 8 weight % water obtained by normal conditions can be used for obtaining the strengthened gelling material having a sufficiently enhanced gelation capability.

We claim:

1. A gelling material for use in preparing aqueous gels with improved strength, said material comprising dried egg albumen and an amount of one or more compounds selected from the group consisting of vitamin C and vitamin C salts said compounds being in an amount sufficient to improve the strength of said gel.

2. The material of claim 1 wherein said compounds are present in amounts of at least 0.1 weight % based on said dried egg albumen.

3. The material of claim 1 wherein said salts are selected from the group consisting of sodium, potassium and calcium salts of vitamin C.

4. The material of claim 1 which is in the form of powder or granules.

5. The material of claim 1 containing 5 to 11 weight % moisture.

6. A method for manufacturing a gelling material for use in preparing aqueous gels with improved strength, said method comprising adding an amount of one or more compounds selected from the group consisting of vitamin C and vitamin C salts to dry egg albumen in the form of powder or granules, whereby the strength of a gel prepared therefrom is improved.

7. The method of claim 6 wherein said compounds are added in amounts of at least 0.1 weight % to said dry egg albumen.

8. The method of claim 6 wherein said salts are selected from the group consisting of sodium, potassium and calcium salts of vitamin C.

9. The method of claim 6 wherein said dry egg albumen is produced by freeze-drying, pan-drying, or spray-drying.

10. The method of claim 6 wherein said dry egg albumen contains 5 to 11 weight % moisture.

11. The method of claim 6 wherein gelling material is stored at an elevated temperature below decomposition temperature of said material.

12. A method for manufacturing a gelling material for use in preparing aqueous gels with improved strength, said method comprising adding an amount of one or more compounds selected from the group consisting of vitamin C and vitamin C salts to dry egg albumen in the form of powder or granules to produce a mixture, followed by storing said mixture at an elevated temperature below decomposition temperature of said material, whereby the strength of a gel prepared therefrom is improved.

13. The method of claim 12 wherein said compounds are added in amounts of at least 0.1% by weight to said dry egg albumen.

14. The method of claim 12 wherein said salts are selected from the group consisting of sodium, potassium and calcium salts of vitamin C.

15. The method of claim 12 wherein said dry egg albumen is produced by freeze-drying, pan-drying, or spray-drying.

16. The method of claim 12 wherein said dry egg albumen contains 5 to 12 weight % moisture.

17. The method of claim 12 wherein said storing is at a temperature of 55 to 75 degrees C. for three to seven days, and said material contains 5 to 11 weight % moisture.

18. A method for manufacturing gelling material for use in preparing aqueous gels with improved strength, said method comprising adding an amount of one or more compounds selected from the group consisting of vitamin C and vitamin C salts to liquid egg white to produce a mixture, followed by drying said mixture, whereby the strength of a gel prepared therefrom is improved.

19. The method of claim 18 wherein said compounds are added in amounts of at least 0.01 weight % to said liquid egg white.

20. The method of claim 18 wherein said salts are selected from the group consisting of sodium, potassium and calcium salts of vitamin C.

21. The method of claim 18 wherein said mixture is dried by freeze-drying, pan-drying, or spray-drying.

22. The method of claim 18 wherein said strengthened gelling material contains 5 to 11 weight % moisture.

23. A method for manufacturing a gelling material for use in preparing aqueous gels with improved strength, said method comprising adding an amount of one or more compounds selected from the group consisting of vitamin C and vitamin C salts to liquid egg white to produce a mixture, drying said mixture, followed by storing said mixture at an elevated temperature below decomposition temperature of said material, whereby the strength of a gel prepared therefrom is improved.

24. The method of claim 23 wherein said compounds are added in amounts of at least 0.1 weight % to said liquid egg white.

25. The method of claim 23 wherein said salts are selected from the group consisting of sodium, potassium and calcium salts of vitamin C.

26. The method of claim 23 wherein said mixture is dried by freeze-drying, pan-drying, or spray-drying.

27. The method of claim 23 wherein said mixture, after drying, contains 5 to 12 weight % moisture.

28. The method of claim 23 wherein said storing is at a temperature of 55 to 75 degrees C. for a period of three to seven days, and said strengthened gelling material contains 5 to 11 weight % moisture.

* * * * *